US007312753B2

(12) United States Patent
Inaba

(10) Patent No.: US 7,312,753 B2
(45) Date of Patent: Dec. 25, 2007

(54) MOBILE TERMINAL POSITIONING SYSTEM

(75) Inventor: Arata Inaba, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 10/577,779

(22) PCT Filed: Sep. 15, 2004

(86) PCT No.: PCT/JP2004/013422

§ 371 (c)(1),
(2), (4) Date: Apr. 28, 2006

(87) PCT Pub. No.: WO2005/041602

PCT Pub. Date: May 6, 2005

(65) Prior Publication Data

US 2007/0075899 A1  Apr. 5, 2007

(30) Foreign Application Priority Data

Oct. 29, 2003  (JP) ............................. 2003-368195

(51) Int. Cl.
*G01S 1/24* (2006.01)
(52) U.S. Cl. .................. 342/465; 342/458; 342/463
(58) Field of Classification Search ................ 342/387, 342/442, 458, 463–465
See application file for complete search history.

(56) References Cited

FOREIGN PATENT DOCUMENTS

| EP | 1 204 234 A2 | 5/2002 |
|---|---|---|
| JP | 11-178038 | 7/1999 |
| JP | 2000-134135 | 5/2000 |
| JP | 2000-252954 | 9/2000 |
| JP | 2002-014152 | 1/2002 |
| JP | 2002-040121 A | 2/2002 |

OTHER PUBLICATIONS

Inaba et al., IEICE Trans. Commun., vol. E85-B, No. 10 Oct. 2002, INABA and Nakagawa: Accuracy Evaluation of Mobile Terminal Positioning Using Broadband Cellular System.
Arata Inaba and Masao Nakagawa, The Institute of Electronics, Information and Communication Engineers, Technical Report of IEICE. RCS2001-32 (May 2005), Comparison of Estimated Location Performance at Urban Area in Broadband Wireless Channel.

*Primary Examiner*—Thomas H. Tarcza
*Assistant Examiner*—Fred H. Mull
(74) *Attorney, Agent, or Firm*—Dickstein, Shapiro, LLP.

(57) ABSTRACT

There is provided a radio base station apparatus which is capable of increasing the probability of detection of a first path even if a radio transmission path fluctuates due to fading or the like, and of downsizing and reducing the cost of mobile radio terminal apparatus. SIR estimators 13-1 through 13-N calculate reception SIRs for respective subcarriers from output signals from pilot demodulators 12-1 through 12-N. SIR averager 14 averages the SIRs for the respective subcarriers to calculate an SIR for the overall signal. Based on the calculated SIR, threshold value setting unit 15 sets a threshold value for a path search. First path detector 19 conducts a path search based on the threshold set by threshold value setting unit 15. Arrival time calculator 21 calculates an arrival time based on a first path detected by first path detector 19.

16 Claims, 6 Drawing Sheets

[Fig.1]
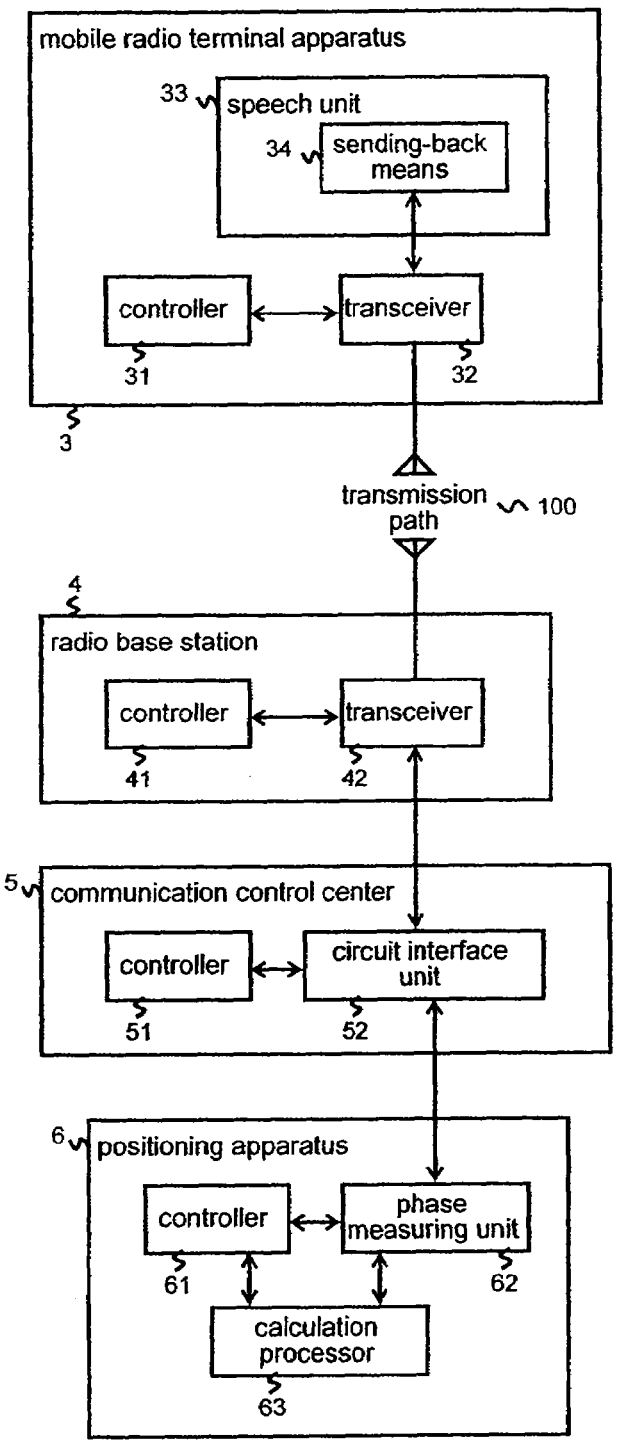
PRIOR ART

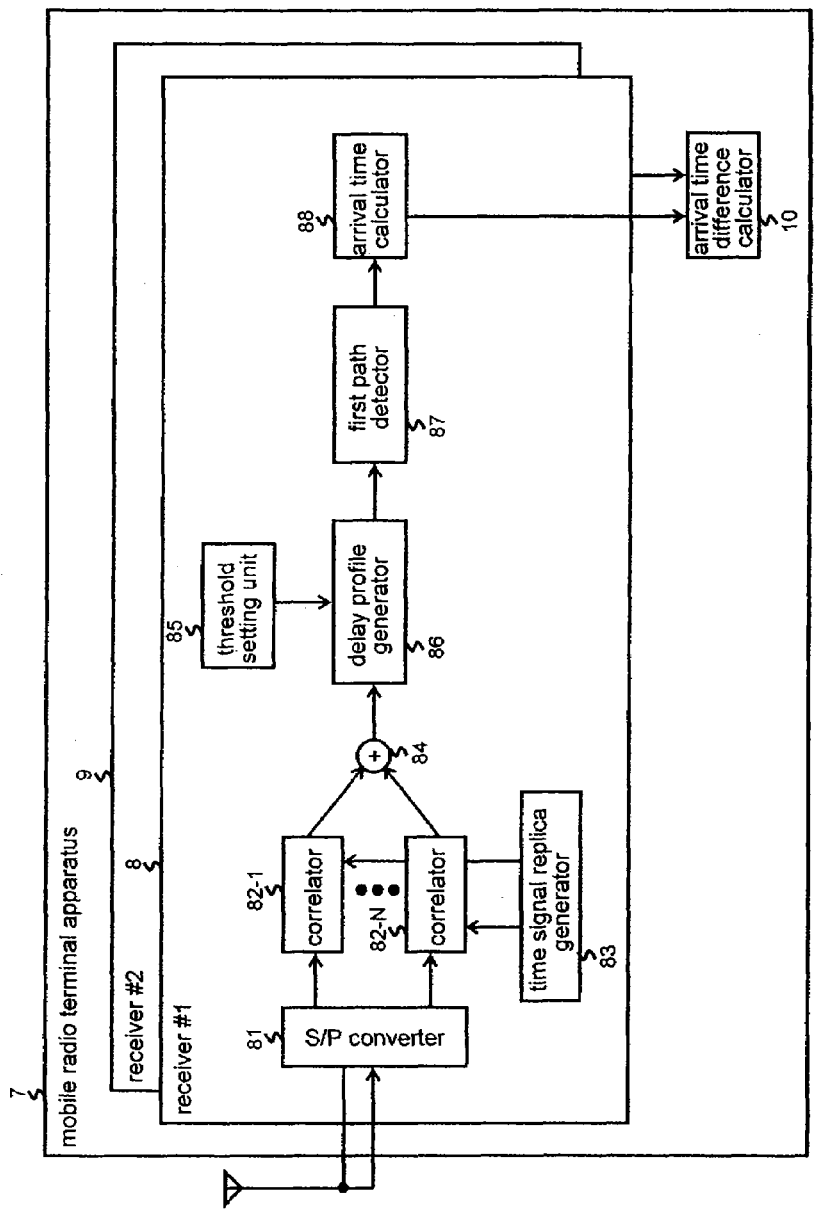
[Fig.2] PRIOR ART

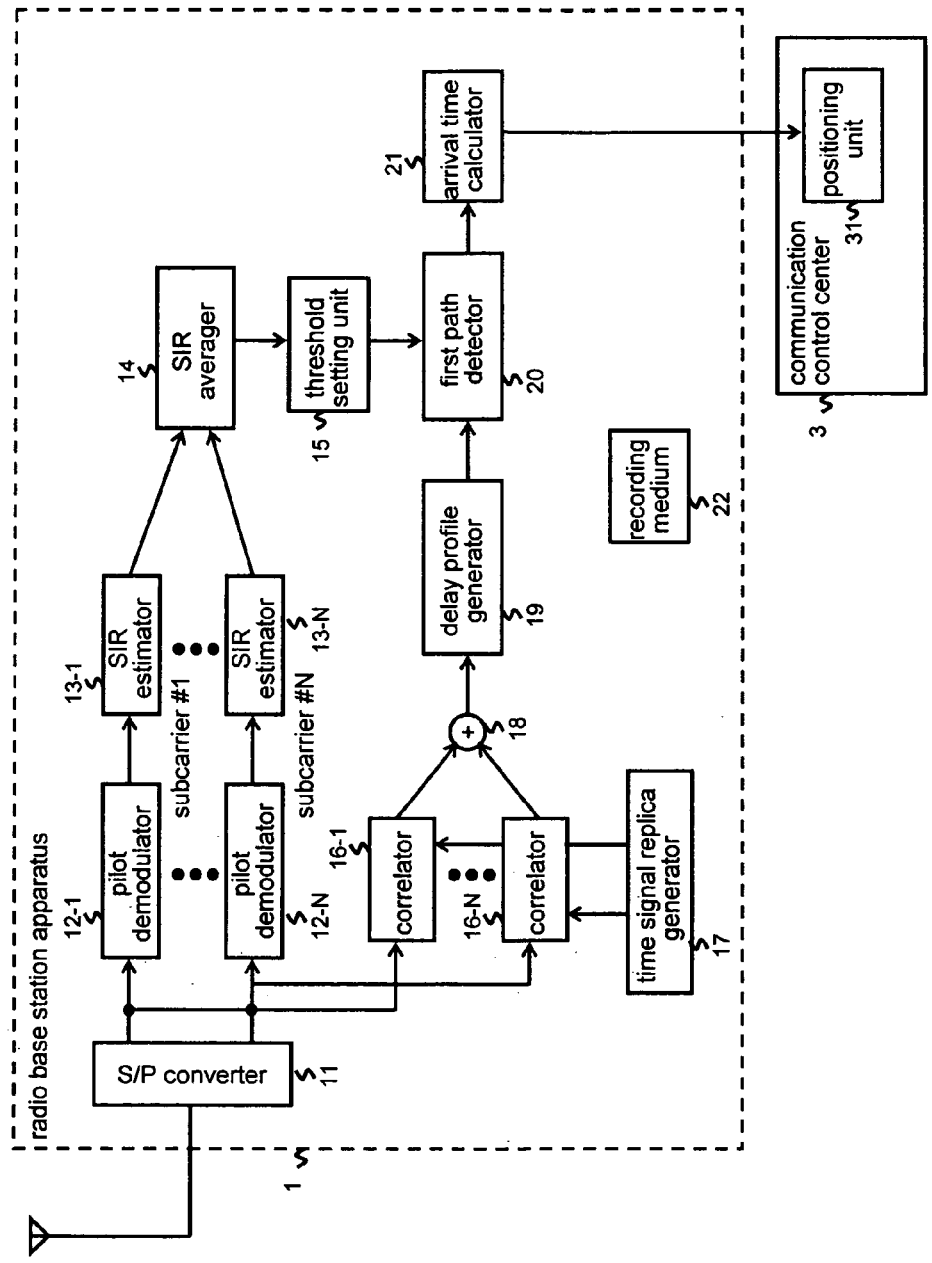
[Fig.3]

[Fig.4]
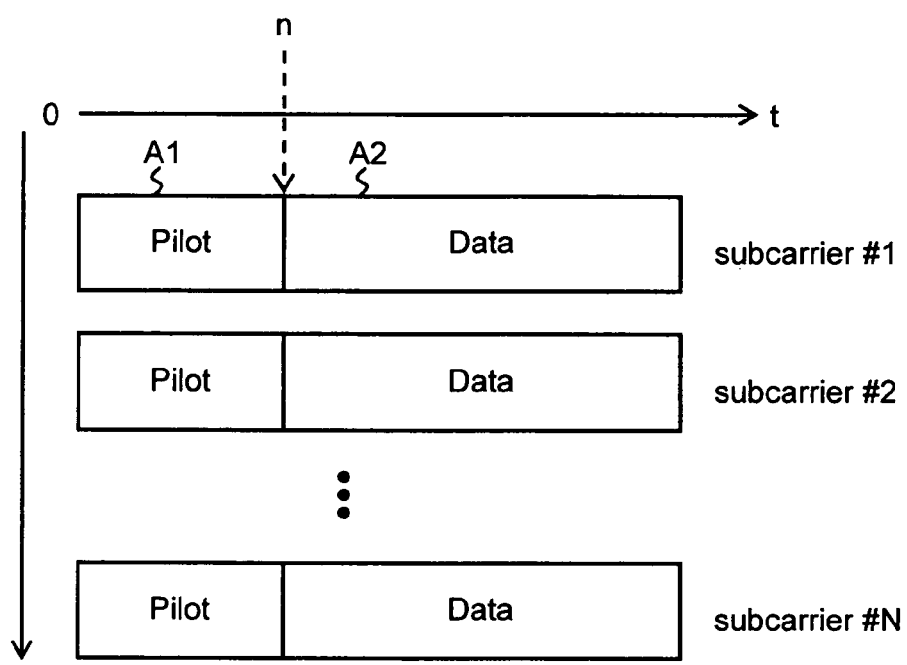

[Fig.5]
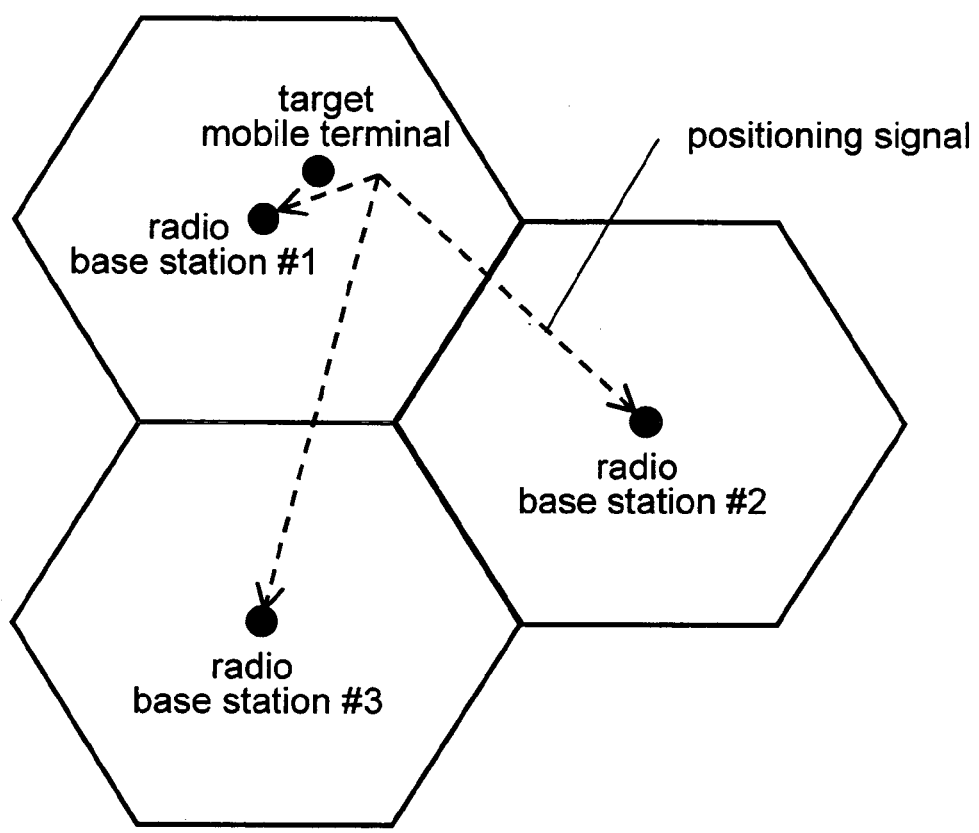

[Fig.6]
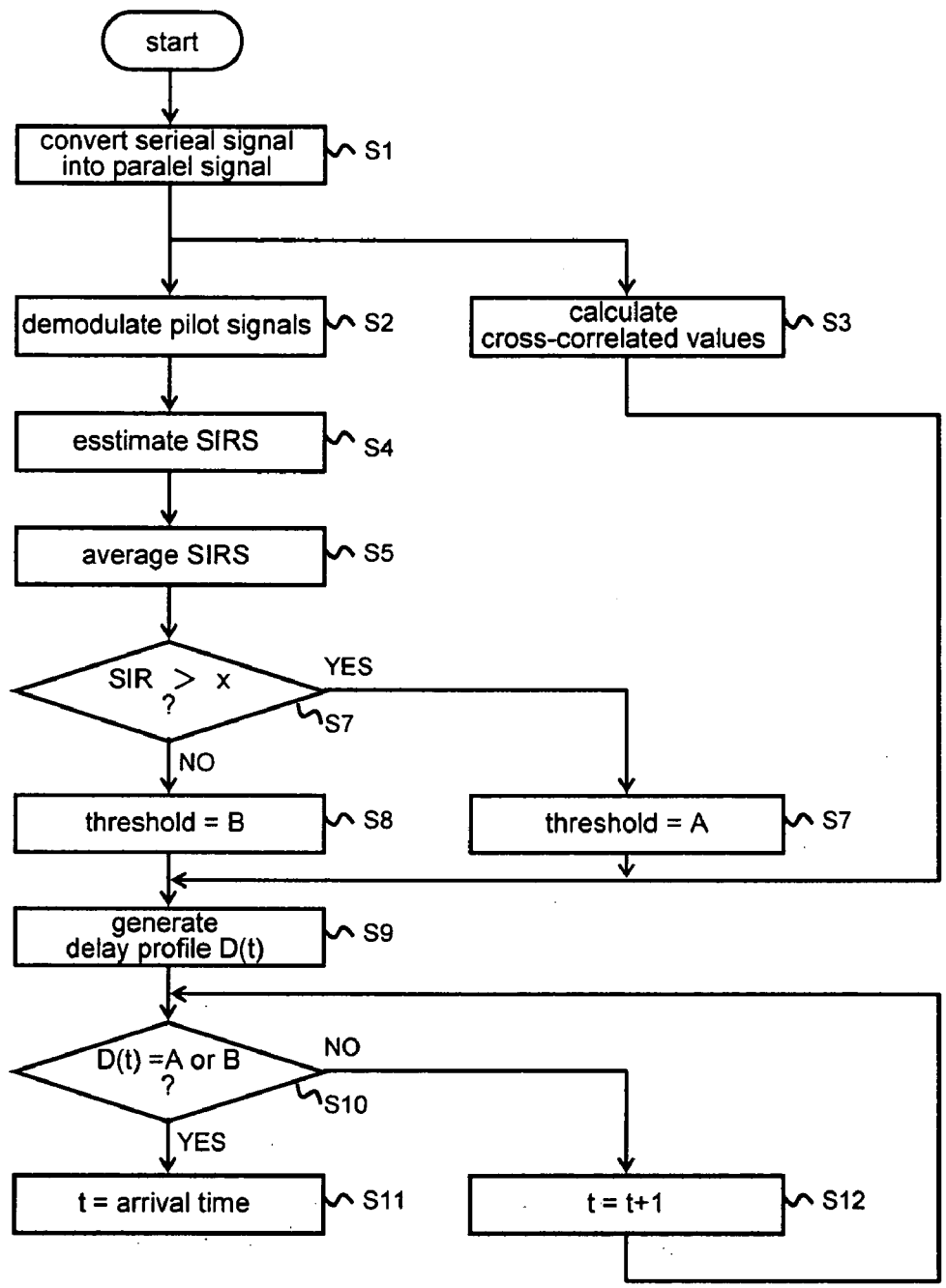

MOBILE TERMINAL POSITIONING SYSTEM

TECHNICAL FIELD

The present invention relates to a mobile terminal positioning system, a radio base station apparatus and a mobile terminal positioning method for use therein, and a program therefor, and more particularly to a positioning method using a cellular phone radio base station apparatus in a next-generation communication system.

BACKGROUND ART

The positioning technology is one of important applications in next-generation communication systems. Although the positioning technology has already put to practical use at present, it is necessary to discuss a process for positioning a mobile terminal in a next-generation communication system which is capable of high-speed download communications.

As shown in FIG. 1, there is a process for positioning a mobile terminal using a radio base station apparatus based on a function for mobile radio terminal apparatus 3 to send back a signal that has been received from radio base station 4 through transmission path 100 (see, for example, JP-A No. 11-178038).

Positioning apparatus 6 is connected to radio base station 4 through communication control center 5. Positioning apparatus 6 measures a propagation delay time (phase) from a sent signal and a signal sent back from mobile radio terminal apparatus 3, and measures the distance between radio base station 4 and mobile radio terminal apparatus 3 based on the radio wave propagation speed.

Mobile radio terminal apparatus 3 comprises controller 31, transceiver 32, and speech unit 33 having sending-back means 34. Radio base station 4 comprises controller 41 and transceiver 42. Communication control center 5 comprises controller 51 and circuit interface unit 52. Positioning apparatus 6 comprises controller 61, phase measuring unit 62, and calculation processor 63.

However, the above mobile communication system with the positioning capability is problematic in that since no specific examples of the modulation process, etc. are not shown, there is not much information about how to operate the system in practice. Just like W-CDMA (Wideband-Code Division Multiple Access) used as the present third-generation mobile communication system, it is necessary for practical application to present a specific system for a certain scheme that has been established.

Furthermore, the above mobile communication system with the positioning capability is disadvantageous in that it tends to cause a propagation time error. Though there is no problem arising if transmission path 100 shown in FIG. 1 provides a clear obstacle-free environment, there are certain obstacles present in transmission path 100 in reality. Particularly in an urban area, shadowing occurs due to buildings or the like, and reflections from other directions reach radio base station 4 and cause multipath fading, making it difficult to position mobile radio terminal apparatus 3 along a straight distance.

To solve the above problems, there has been proposed, as a conventional mobile communication system with a positioning capability, a mobile terminal positioning system using an OFDM (Orthogonal Frequency Division Multiplexing) radio base station apparatus, as disclosed in Document 1 shown below.

Document 1: "The Institute of Electronics, Information and Communication Engineers, Technical Report RCS2001-32", May 2001

A positioning process using a path search has been proposed as a process for reducing a propagation time error between a base station and a mobile terminal in a multipath environment, as disclosed in Document 2 shown below.

Document 2: "IEICE TRANSACTIONS ON COMMUNICATIONS", Vol. E85-B, No. 10, October 2002

An article in Document 2 shows the system of a mobile radio terminal apparatus incorporating a path search for W-CMDA and OFDM. The system is configured as shown in FIG. 2.

FIG. 2 illustrates a system capable of measuring an arrival time difference between download positioning signals sent from different radio base stations (not shown). Mobile radio terminal apparatus 7 has receivers (#1, #2) 8, 9 which measure arrival times depending on download positioning signals from different radio base stations.

Receiver (#1) 8 has time signal replica generator 83 for generating a replica of a known pilot signal and correlators 82-1 through 82-N for calculating cross-correlated values of subcarriers. Delay profile generator 86 generates a delay profile based on the sum of output signals, which sum is calculated by adder 84. Delay profile generator 86 is set to a threshold value for a path search by a threshold value setting unit 85. First path detector 87 detects a first arrival path, and an arrival time calculator 88 measures an arrival time.

In FIG. 2, mobile radio terminal apparatus 7 is constructed of receivers (#1, #2) 8, 9 and arrival time difference calculator 10. Receiver (#1) 8 comprises S/P (Serial/Parallel) converter 81, correlators 82-1 through 82-N, time signal replica generator 83, adder 84, threshold setting unit 85, delay profile generator 86, first path detector 87, and arrival time calculator 88. Though not shown, receiver (#2) 9 is of the same construction as receiver (#1) 8.

Mobile radio terminal apparatus 7 calculates arrival times from respective two radio base stations, and produces output signals representative of the calculated arrival times from respective receivers (#1, #2) 8, 9. In mobile radio terminal apparatus 7, using the output signals from two receivers (#1, #2) 8, 9 which correspond to the respective radio base stations, arrival time difference calculator 10 can measure a relative arrival time difference between arrival times from the two radio base stations at mobile radio terminal apparatus 7. Details of a method of calculating the absolute position of mobile radio terminal apparatus 7 from the arrival time difference are revealed in Documents 1, 2, and will not be described below.

However, the above conventional mobile terminal positioning system as it is incorporated in the mobile radio terminal apparatus is problematic in that the mobile radio terminal apparatus tends to be complex and large in size. The tendency runs counter to efforts in recent years to reduce the size and cost of mobile radio terminal apparatus terminal.

Another problem of the conventional mobile terminal positioning system is that the accuracy of a path search is lowered depending on the propagation environment. If the SIR (Signal to Interference power Ratio) is low, then since the path is liable to be buried in noise, it is necessary to set a lower threshold value for path detection. Conversely, if the SIR is high, it is necessary to set a higher threshold value to prevent noise from being detected in error as a path.

More specifically, the conventional mobile terminal positioning system anticipates usage in an urban area or the like which is susceptible to shadowing, and is aimed at accurately measuring an arrival time of a signal between a radio base station apparatus and a mobile radio terminal apparatus in a multipath environment. The conventional mobile terminal positioning system employs a path search process for selecting a path that has arrived earliest as a first path, regarding the path as an arrival time, and calculating the distance between the radio base station apparatus and the mobile radio terminal apparatus.

For conducting a path search, it is necessary to determine a delay profile and set a threshold value for determining whether a path is found or not in order to detect a correlation peak. In the actual environment of a cellular phone radio network, however, received signals fluctuate and are attenuated by fading.

When the reception SIR is low, there is a tendency for a higher probability of burial of a path in noise. If the set threshold value is too high, then a path may not possibly be detected. Conversely, if the set threshold value is too low, then noise may easily be detected in error as a path. If the same threshold value is set as when the reception SIR is high, then it is difficult to detect a proper first path due to the propagation environment. In such a situation, the positioning accuracy is lowered because the arrival time of a signal between the radio base station apparatus and the mobile radio terminal apparatus is measured from the falsely detected first path.

DISCLOSURE OF THE INVENTION

It is an object of the present invention to provide a mobile terminal positioning system, a radio base station apparatus and a mobile terminal positioning method for use therein, and a program therefor, which are capable of increasing the probability of detection of a first path even if a radio transmission path fluctuates due to fading or the like, and of downsizing and reducing the cost of mobile radio terminal apparatus.

According to the present invention, a mobile terminal positioning system for positioning a mobile radio terminal apparatus by detecting the arrival time of a signal between a radio base station apparatus and the mobile radio terminal apparatus, the mobile radio terminal apparatus comprises:

estimating means for calculating reception SIRs (Signal to Interference power Ratios) for respective subcarriers with respect to a received signal from the mobile radio terminal apparatus;

averaging means for averaging the SIRs calculated for the respective subcarriers by the estimating means;

threshold value setting means for setting a threshold value for a path search based on an SIR calculated by the averaging means;

first path detecting means for conducting the path search based on the threshold value set by the threshold value setting means, to detect a first path; and arrival time calculating means for calculating the arrival time based on the first path detected by the first path detecting means.

According to the present invention, a radio base station apparatus for positioning a mobile radio terminal apparatus by detecting the arrival time of a signal between the radio base station apparatus and the mobile radio terminal apparatus, comprises:

estimating means for calculating reception SIRs (Signal to Interference power Ratios) for respective subcarriers with respect to a received signal from the mobile radio terminal apparatus;

averaging means for averaging the SIRs calculated for the respective subcarriers by the estimating means;

threshold value setting means for setting a threshold value for a path search based on an SIR calculated by the averaging means;

first path detecting means for conducting the path search based on the threshold value set by the threshold value setting means, to detect a first path; and arrival time calculating means for calculating the arrival time based on the first path detected by the first path detecting means.

According to the present invention, a method of positioning a mobile radio terminal apparatus by detecting the arrival time of a signal between a radio base station apparatus and the mobile radio terminal apparatus, comprises, as performed by the radio base station apparatus, the steps of: calculating reception SIRs (Signal to Interference power Ratios) for respective subcarriers with respect to a received signal from the mobile radio terminal apparatus; averaging the SIRs calculated for the respective subcarriers; setting a threshold value for a path search based on an averaged SIR; conducting the path search based on the set threshold value to detect a first path; and calculating the arrival time based on the detected first path.

According to the present invention, a program for a method of positioning a mobile radio terminal apparatus by detecting the arrival time of a signal between a radio base station apparatus and the mobile radio terminal apparatus, enables a computer to perform the steps of: calculating reception SIRs (Signal to Interference power Ratios) for respective subcarriers with respect to a received signal from the mobile radio terminal apparatus; averaging the SIRs calculated for the respective subcarriers; setting a threshold value for a path search based on an averaged SIR; conducting the path search based on the set threshold value to detect a first path; and calculating the arrival time based on the detected first path.

Even if it is difficult to detect a path arriving from the mobile radio terminal apparatus due to fading or like caused in a radio zone, the mobile terminal positioning system according to the present invention reduces an error occurring when the arrival time of a signal between the radio base station apparatus and the mobile radio terminal apparatus is estimated.

More specifically, in the mobile terminal positioning system according to the present invention, SIR (Signal to Interference power Ratio) estimators calculate reception SIRs for respective subcarriers from received signals (output signals from pilot modulators) in a radio base station system.

An SIR of the overall signal is calculated as an average of the SIRs for respective subcarriers. The calculated SIR is input to a threshold value setting unit which sets a threshold value for a path search. The threshold value setting unit sets a threshold value for the SIR input thereto. A first path detector conducts a path search based on the threshold value set by the threshold value setting unit.

With the mobile terminal positioning system according to the present invention, as described above, since an appropriate threshold value for a path search is set using a received signal level represented by an SIR, even if the reception SIRs fluctuate in a fading environment, the accuracy with which to detect a first path is increased to increase the accuracy with which to measure a propagation time, resulting in an increase in the accuracy with which to position the mobile radio terminal apparatus.

The mobile terminal positioning system according to the present invention thus has a function to set a threshold value for a path search depending on the reception SIRs. If the SIR is higher, then the threshold value is set to a higher value to prevent a path from being detected in error, and if the SIR is lower, then the threshold value is set to a lower value in order to be able to catch a path. Therefore, the probability of detection of a first path is increased even if the radio transmission path fluctuates due to fading or the like.

Furthermore, with the mobile terminal positioning system according to the present invention being incorporated in the radio base station apparatus, the circuit arrangement of the mobile radio terminal apparatus is minimized, thereby downsizing and reducing the cost of the mobile radio terminal apparatus.

Moreover, inasmuch as the mobile terminal positioning system according to the present invention employs multi-carrier modulation that is supposed to be resistant to multipath fading, signal degradation, at the time upload pilot signals from the mobile radio terminal apparatus are demodulated, is reduced, so that the accuracy with which to estimate SIRs is improved.

BRIEF DESCRIPTION OF THE DRAWINGS

FIG. 1 is a block diagram of a mobile terminal positioning system employing a conventional radio base station apparatus;

FIG. 2 is a block diagram of the system of conventional radio base station apparatus incorporating a path search;

FIG. 3 is a block diagram of a radio base station apparatus according to an embodiment of the present invention;

FIG. 4 is a diagram showing a configurational example of an OFDM frame which is used in the embodiment of the invention and is descriptive of the relationship between times and frequencies;

FIG. 5 is a diagram showing the manner for positioning using an upload signal in the embodiment of the invention; and FIG. 6 is a flowchart of an operation sequence of the radio base station apparatus shown in FIG. 3.

BEST MODE FOR CARRYING OUT THE INVENTION

An embodiment of the present invention will be described below with reference to the drawings. FIG. 3 is a block diagram of a radio base station apparatus according to an embodiment of the present invention. As shown in FIG. 3, radio base station apparatus 1 comprises S/P (Serial/Parallel) converter 11, pilot demodulators 12-1 through 12-N, SIR (Signal to Interference power Ratio) estimators 13-1 through 13-$n$, SIR averager 14, threshold value setting unit 15, correlators 16-1 through 16-N, time signal replica generator 17, adder 18, delay profile generator 19, first path detector 20, arrival time calculator 21, and recording medium 22. Radio base station apparatus 1 is connected to communication control center 3 having positioning unit 31. Recording medium 22 stores a program (a program that can be executed by a computer) for realizing various processing details in radio base station apparatus 1.

A received signal from a mobile radio terminal apparatus, not shown, is input to S/P converter 11. The received signal is modulated by QPSK (Quadrature Phase Shift Keying) or the like. S/P converter 11 divides the received signal into signals of respective subcarriers. The divided signals are input to respective pilot demodulators 12-1 through 12-N which correspond to the respective subcarriers.

The positions of pilot signals with respect to the subcarriers assume the usage of a frame format as shown in FIG. 4. Since the pilot signals are known, time signal waveform replicas corresponding thereto may be generated by time signal replica generator 17.

FIG. 4 is a diagram showing a configurational example of an OFDM (Orthogonal Frequency Division Multiplexing) frame which is used in the embodiment of the invention and is descriptive of the relationship between times and frequencies. As shown in FIG. 4, pilot signal A1 is inserted in the beginning part of a frame. The number of symbols of pilot signals is subject to a trade-off in that if the number of symbols is large, then greater reliability is achieved when an SIR is calculated, but the positioning time increases. Therefore, the number of symbols will not be prescribed in particular.

SIR estimators 13-1 through 13-N calculate SIRs from digital signals obtained from pilot demodulators 12-1 through 12-N based on a desired wave reception level and an interference wave reception level. Since SIR estimators 13 determine SIRs for the respective subcarriers, the SIRs need to be averaged by SIR averager 14 in order to calculate an SIR in one frame finally for the overall carrier.

When the SIR is calculated by SIR averager 14, threshold value setting unit 15 determines a threshold value according to the relationship between predetermined SIRs and threshold values. The specific relationship between SIRs and threshold values will be omitted as it has not direct bearing on the present invention. However, because a delay profile generated from a normalized cross-correlation takes a value in the range from 0 to 1, if the reception SIR is low, then the operation to set a lower threshold value is performed in order to be able to catch a path.

The received signal from S/P converter 11 is input to correlators 16-1 through 16-N as well as pilot demodulators 12-1 through 12-N. Correlators 16-1 through 16-N use an output signal from time signal replica generator 17 with respect to the pilot signals, and calculate, for the respective subcarriers, cross-correlated values R at certain time t between the received signal and the replica signal, as described below. A cross-correlated value R is calculated according to the following equation:

$$R = \int_0^n Ar_I(t)A_I(t)dt + \int_0^n Ar_Q(t)A_Q(t)dt \qquad [\text{equation 1}]$$

where $Ar_I(t)$, $Ar_Q(t)$ represent the amplitudes in I and Q phase of the replica signal, $A_I(t)$, $A_Q(t)$ the amplitudes of the received signal, and n the time of a segment corresponding to pilot signal A1. The cross-correlation in the segment corresponding to pilot signal A1 can be calculated according to the above equation.

Adder 18 adds the output signals from correlators 16-1 through 16-N to produce a signal representing the sum for all the subcarriers, and outputs the signal to delay profile generator 19. First path detector 20 detects a path with an earliest arrival time with the threshold value produced by threshold value setting unit 15. Specifically, first path detector 20 compares the values of the delay profiles and the threshold value in the sequence from time 0 to time n. First path detector 20 regards the first delay profile which has exceeded the threshold value as a detected path, and calculates the time upon detection thereof.

Arrival time calculator 21 calculates a propagation time between the mobile radio terminal apparatus to be positioned and radio base station apparatus 1. Radio base station apparatus are connected to communication control center 3, and indicate arrival times calculated by respective arrival time calculators 21 to communication control center 3 as a host system. When communication control center 3 receive a propagation time between the mobile radio terminal apparatus and each of the radio base station apparatus 1, positioning unit 31 finally determines the absolute position of the mobile radio terminal apparatus.

FIG. 5 shows the manner for positioning using an upload signal in the embodiment of the invention. In FIG. 5, a system for using different frequencies in respective cells is assumed. Therefore, a signal from the mobile radio terminal apparatus to be position can be received by radio base station apparatus in adjacent cells.

If there are three radio base station apparatus #1 through #3 for one mobile radio terminal apparatus, then three arrival times can be calculated, and the absolute position of the mobile radio terminal apparatus can be determined. The process of determining the absolute position of the mobile radio terminal apparatus is well known to the person skilled in the art and disclosed in Document 1 referred to above, and will not be described in detail below as it has not direct bearing on the present invention.

The present embodiment is also applicable to a system using MC-CDMA (Multi-Carrier—Code Division Multiple Access), rather than OFDM, as the multi-carrier transmission process.

FIG. 6 is a flowchart of an operation sequence of radio base station apparatus 1 shown in FIG. 3. Operation of radio base station apparatus 1 according to the embodiment of the present invention will be described below with reference to FIGS. 3 through 6. The processing sequence shown in FIG. 6 is realized when a CPU (Central Processing unit), not shown, of radio base station apparatus 1 executes the program stored in recording medium 22.

In radio base station apparatus 1, S/P converter 1 converts a received signal from the mobile radio terminal apparatus from a serial signal into a parallel signal (step 1 in FIG. 6), and divides the entire time signal into time signals of respective subcarriers. Pilot demodulators 12-1 through 12-N demodulate pilot signals from the time signals divided by S/P converter 1, and determine signal points in QPSK signal points (step 2 in FIG. 6).

The time signals divided by S/P converter 1 are also output to correlators 16-1 through 16-N. Correlators 16-1 through 16-N calculate use an output signal from time signal replica generator 17 with respect to the known pilot signals, and calculate cross-correlated values R for the respective subcarriers (step S3 in FIG. 6).

SIR estimators 13-1 through 13-N estimate SIRs based on the signal points obtained by pilot demodulators 12-1 through 12-N (step S4 in FIG. 6), and SIR averager 14 averages the SIRs (step S5 in FIG. 6). SIR averager 14 averages the SIRs determined for the respective subcarriers by SIR estimators 13-1 through 13-N, for all the subcarriers.

Threshold value setting unit 15 determines in advance the relationship between SIRs and threshold values, and determines a threshold value according to the SIR calculated by SIR averager 14. Specifically, if SIR>x (step S6 in FIG. 6), then threshold value setting unit 15 sets the threshold value to "A" (step S7 in FIG. 6), and if SIR$\leq$x (step S6 in FIG. 6, then threshold value setting unit 15 sets the threshold value to "B" (step S7 in FIG. 6). The present embodiment sets the threshold value selectively to two values. However, it is possible to set the threshold value selectively to three or more values.

Adder 18 adds the cross-correlated values obtained by correlators 16-1 through 16-N to produce the sum for all the subcarriers. Delay profile generator 19 generates a delay profile based on the sum for all the subcarriers (step S9 in FIG. 6). In the present embodiment, the delay profile is a function D(t) of time.

First path detector 20 starts from t=0 and compares the value of D(t) with the set threshold value to detect a first path (steps S10, S12 in FIG. 6). First path detector 20 calculates the value of t at the time the value of D(t) initially exceeds the threshold value ("A" or "B") as the arrival time of a signal between the mobile radio terminal apparatus and radio base station apparatus 1 (step S11 in FIG. 6).

When radio base station apparatus 1 calculates the arrival time, it indicates the arrival time to communication control center 3 as a host system. Positioning unit 31 of communication control center 3 uses the arrival times obtained from a plurality of radio base station apparatus, and determines the absolute position of the mobile radio terminal apparatus to be positioned.

The present embodiment, as described above, has threshold value setting unit 15 for setting a threshold value for conducting a path search depending on the reception SIR. If the reception SIR is high, threshold value setting unit 15 sets a higher threshold value to prevent a path from being detected in error. If the reception SIR is low, threshold value setting unit 15 sets a lower threshold value in order to be able to catch a path. Therefore, the probability of detection of a first path is increased even if the radio transmission path fluctuates due to fading or the like.

According to the present embodiment, furthermore, with the above mobile terminal positioning system being incorporated in radio base station apparatus 1, the circuit arrangement of the mobile radio terminal apparatus is minimized, thereby downsizing and reducing the cost of the mobile radio terminal apparatus.

According to the present embodiment, moreover, inasmuch as multi-carrier modulation that is supposed to be resistant to multipath fading is employed, signal degradation, at the time upload pilot signals from the mobile radio terminal apparatus are modulated, is reduced, so that the accuracy with which to estimate SIRs is improved.

INDUSTRIAL APPLICABILITY

The present invention is not limited to the above embodiment, but may be applied to radio base station apparatus which handle other digitally modulated signals according to modulation processes such as W-CDMA (Wideband-Code Division Multiple Access) or the like. The present invention is applicable to mobile communication systems which employ radio base station apparatus incorporating cellular phones or the like.

The invention claimed is:

1. A mobile terminal positioning system for positioning a mobile radio terminal apparatus by detecting the arrival time of a signal between a radio base station apparatus and the mobile radio terminal apparatus, said radio base station apparatus comprising:

estimating means for calculating reception SIRs (Signal to Interference power Ratios) for respective subcarriers with respect to a received signal from said mobile radio terminal apparatus;

averaging means for averaging the SIRs calculated for the respective subcarriers by said estimating means;

threshold value setting means for setting a threshold value for a path search based on an SIR calculated by said averaging means;

first path detecting means for conducting said path search based on the threshold value set by said threshold value setting means, to detect a first path; and arrival time calculating means for calculating said arrival time based on the first path detected by said first path detecting means.

2. The mobile terminal positioning system according to claim 1, wherein said threshold value setting means sets said threshold value to a higher value when said SIR is higher and sets said threshold value to a lower value when said SIR is lower.

3. The mobile terminal positioning system according to claim 1, wherein said radio base station apparatus further comprises:

pilot demodulating means for demodulating a pilot signal based on the received signal from said mobile radio terminal apparatus;

wherein said estimating means estimate said SIRs based on a desired wave reception level and an interference wave reception level for a digital signal obtained from said pilot demodulating means.

4. The mobile terminal positioning system according to claim 1, wherein either one of at least OFDM (Orthogonal Frequency Division Multiplexing) and MC-CDMA (Multi-Carrier-Code Division Multiple Access) is employed as a multi-carrier transmission process.

5. The mobile terminal positioning system according to claim 1, wherein at least a W-CMDA (Wideband-Code Division Multiple Access) modulation process is employed.

6. A radio base station apparatus for positioning a mobile radio terminal apparatus by detecting the arrival time of a signal between the radio base station apparatus and the mobile radio terminal apparatus, comprising:

estimating means for calculating reception SIRs (Signal to Interference power Ratios) for respective subcarriers with respect to a received signal from said mobile radio terminal apparatus;

averaging means for averaging the SIRs calculated for the respective subcarriers by said estimating means;

threshold value setting means for setting a threshold value for a path search based on an SIR calculated by said averaging means;

first path detecting means for conducting said path search based on the threshold value set by said threshold value setting means, to detect a first path; and arrival time calculating means for calculating said arrival time based on the first path detected by said first path detecting means.

7. The radio base station apparatus according to claim 6, wherein said threshold value setting means sets said threshold value to a higher value when said SIR is higher and sets said threshold value to a lower value when said SIR is lower.

8. The radio base station apparatus according to claim 6, further comprising:

pilot demodulating means for demodulating a pilot signal based on the received signal from said mobile radio terminal apparatus;

wherein said estimating means estimate said SIRs based on a desired wave reception level and an interference wave reception level for a digital signal obtained from said pilot demodulating means.

9. The radio base station apparatus according to claim 6, wherein either one of at least OFDM (Orthogonal Frequency Division Multiplexing) and MC-CDMA (Multi-Carrier-Code Division Multiple Access) is employed as a multi-carrier transmission process.

10. The radio base station apparatus according to claim 6, wherein at least a W-CMDA (Wideband-Code Division Multiple Access) modulation process is employed.

11. A method of positioning a mobile radio terminal apparatus by detecting the arrival time of a signal between a radio base station apparatus and the mobile radio terminal apparatus, said method comprising, as performed by said radio base station apparatus, the steps of:

calculating reception SIRs (Signal to Interference power Ratios) for respective subcarriers with respect to a received signal from said mobile radio terminal apparatus;

averaging the SIRs calculated for the respective subcarriers; setting a threshold value for a path search based on an averaged SIR;

conducting said path search based on the set threshold value to detect a first path; and calculating said arrival time based on the detected first path.

12. The method according to claim 11, wherein said step of setting a threshold value comprises the step of setting said threshold value to a higher value when said SIR is higher and sets said threshold value to a lower value when said SIR is lower.

13. The method according to claim 11, further comprising, as performed by said radio base station apparatus, the step of:

demodulating a pilot signal based on the received signal from said mobile radio terminal apparatus;

wherein said step of calculating reception SIRs comprises the step of estimating said SIRs based on a desired wave reception level and an interference wave reception level of said demodulated pilot signal.

14. The method according to claim 11, wherein said radio base station apparatus employs either one of at least OFDM (Orthogonal Frequency Division Multiplexing) and MC-CDMA (Multi-Carrier-Code Division Multiple Access) as a multi-carrier transmission process.

15. The method according to claim 11, wherein said radio base station apparatus employs at least a W-CMDA (Wideband-Code Division Multiple Access) modulation process.

16. A program for a method of positioning a mobile radio terminal apparatus by detecting the arrival time of a signal between a radio base station apparatus and the mobile radio terminal apparatus, said program enabling a computer to perform the steps of:

calculating reception SIRs (Signal to Interference power Ratios) for respective subcarriers with respect to a received signal from said mobile radio terminal apparatus;

averaging the SIRs calculated for the respective subcarriers;

setting a threshold value for a path search based on an averaged SIR;

conducting said path search based on the set threshold value to detect a first path; and calculating said arrival time based on the detected first path.

* * * * *